(12) United States Patent
Edwards et al.

(10) Patent No.: US 11,556,908 B2
(45) Date of Patent: *Jan. 17, 2023

(54) METHODS AND SYSTEMS FOR DECONFLICTING DATA FROM MULTIPLE SOURCES IN COMPUTER SYSTEMS

(71) Applicant: Capital One Services, LLC, McLean, VA (US)

(72) Inventors: Joshua Edwards, McLean, VA (US); Abdelkader M'Hamed Benkreira, McLean, VA (US); Michael Mossoba, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,912

(22) Filed: Sep. 28, 2021

(65) Prior Publication Data

US 2022/0027869 A1 Jan. 27, 2022

Related U.S. Application Data

(63) Continuation of application No. 16/875,955, filed on May 15, 2020, now Pat. No. 11,210,642.

(51) Int. Cl.
*G06Q 20/10* (2012.01)
*G06Q 20/04* (2012.01)
*G07F 7/10* (2006.01)
*G06Q 20/34* (2012.01)
*G06Q 20/40* (2012.01)

(52) U.S. Cl.
CPC ............. *G06Q 20/10* (2013.01); *G06Q 20/04* (2013.01); *G06Q 20/341* (2013.01); *G06Q 20/40* (2013.01); *G07F 7/1008* (2013.01)

(58) Field of Classification Search
CPC ...... G06Q 20/10; G06Q 20/04; G06Q 20/341; G06Q 20/40; G07F 7/1008
See application file for complete search history.

(56) References Cited

U.S. PATENT DOCUMENTS

| | | | | |
|---|---|---|---|---|
| 11,210,642 B2* | 12/2021 | Edwards | ................ | G06Q 20/24 |
| 2015/0206109 A1* | 7/2015 | Caldwell | ................ | G06Q 20/10 |
| | | | | 705/39 |
| 2019/0141006 A1* | 5/2019 | Schnitt | ................... | G06Q 30/06 |

* cited by examiner

*Primary Examiner* — Sonji N Johnson
(74) *Attorney, Agent, or Firm* — Perkins Coie LLP

(57) ABSTRACT

Methods and systems are described for verifying an identity of a user through contextual knowledge-based authentication. The system described uses contextual knowledge-based authentication. By verifying an identity of a user through contextual knowledge-based authentication, the verification is both more secure and more intuitive to the user. For example, by relying on confidential and/or proprietary information, the system may generate verification questions, the answers to which are known only by the user.

20 Claims, 5 Drawing Sheets

METHODS AND SYSTEMS FOR DECONFLICTING DATA FROM MULTIPLE SOURCES IN COMPUTER SYSTEMS

CROSS-REFERENCE TO RELATED APPLICATIONS

This application is a continuation of U.S. patent application Ser. No. 16/875,955, filed May 15, 2020. The content of the foregoing application is incorporated herein in its entirety by reference.

FIELD OF THE INVENTION

The invention relates to deconflicting data from multiple sources in computer systems.

BACKGROUND

In recent years, the use of computers to monitor and track user transactions, in particular, transactions using electronic payments, has increased. Users require an intuitive way of accessing this data in an easy and secure manner, especially when this data may come from multiple sources. However, while commerce through electronic payment systems continues to increase, the backbone of many of these electronic payment systems is credit card data and the credit card network ecosystems. These ecosystems are increasingly being used for online transactions, bill pay, and other mechanisms for which the ecosystem was not initially intended. The repurposing of this ecosystem has led to both peculiarities and hurdles for deconflicting data from multiple sources in that ecosystem.

SUMMARY

Methods and systems are described herein for deconflicting data from multiple sources in computer systems. For example, in response to the growing number of online services such as credit card monitoring, on-line bill paying, and on-line banking services, users are frequently forgoing paper-based methods of monitoring their finances. However, with numerous sources of credit/debit cards, multiple bank accounts, and/or numerous online accounts users may benefit from a single interface that aggregates their various accounts and transactions. A hurdle to overcome with such aggregation services is the ability to correctly detect duplicate transactions and resolve any potential conflicts. However, many online services function through the use of payment systems that were not designed for today's near virtual world. Accordingly, the development of the proprietary encoding methods, proprietary formats, and in many cases the system's own user interfaces, prevent aggregation services from successfully identifying duplicate transactions.

For example, online and electronic payment systems function through a network of interrelated components. These components exchange data to accept, authorize, clear, and settle transactions. A single transaction may include multiple systems interacting with each other and handling record data about a transaction that must be stored, transmitted, and verified in a secure and private manner. A single breakdown in the system may result in the private data being stolen or corrupted. In order to prevent a breakdown and increase efficiency, each system and/or component of a system may use its own (and, in many cases, proprietary) encoding and display formats. These systems are rigidly designed to increase the internal efficiency of the system and prevent errors in transmitting the data that may cause a transaction to be declined. Moreover, the systems were designed independently from each other without regard for centralized standards. Due to these features, matching different transactions based on the data provided by the different sources is difficult for aggregation services, causing them to have duplicate entries. These duplicate entries in turn may prevent a correct account status from being reported by an aggregation service.

The methods and systems herein overcome this problem by storing unconventional data and processing it in unconventional means. In particular, the methods and systems compare transactions based on data that is unlikely to be varied (or vary outside a particular threshold) such as payment information, time stamp, etc. Unlike other information in record data about a transaction, payment amount is substantially consistent. The system may then compare this information to network name information provided with each entry. A network name is a name given to an entity (e.g., a merchant) by a credit card network upon the entity registering with the credit card network. For example, the network name may be an alphanumeric character string that may or may not be unique to one or more entities or a group of entities. The network name may be generated by the network using one or more proprietary algorithms that may include various types of encoding (such as positional encoding), transmission schemes, and/or data formats.

In many instances, a native network name data is also not meant to be human readable. That is, the proprietary algorithm used by a credit card network to generate a network name is generated for the use by the computer components of the credit card network, not for display to end users. However, as a benefit to human users of their online services, some networks may nonetheless display this information to end-users or cleanse this data in order to make it human readable before displaying to end-users. The methods and systems described herein use this particular information in order to deconflict data. For example, by storing record data about a transaction (e.g., payment amount) and by providing user queries that allow for users, through a crowd-source environment, to resolve conflicts related to a network name, the methods and systems may ensure that account information for an aggregation service is correct.

In order to resolve conflicting user transactions, the system may generate a user query with a question that aids in distinguishing between the conflicting information. For example, if the system detects two transactions with some corresponding information (e.g., payment amount, time stamp, etc.), but different network names, the system may determine whether or not the two transactions relate to the same underlying transaction. To do so, the system may generate a user query based on the network name in the form of a human readable question (e.g., "which merchant did this transaction related to?"). Upon receiving the answer, the system may determine whether a given network name corresponds to the same transaction. By using the network name, the system may de-duplicate user transactions for use in generating correct account information by the aggregation service. Moreover, the system may update its records to correlate other data (e.g., Merchant ID data) included in record data with a given network name or merchant based on the answer to the query.

In some embodiments, the system may also automate this process. For example, by first cleansing the network name, and determining a similarity between the network names in record data, and using it to detect conflicts, the system can resolve conflicts more effectively and in an automated fashion. Additionally or alternatively, by using, in some embodiments, an automated system that would conventionally be used to understand human speech to cleanse the network name, the system may more effectively detect conflicts, update merchant information, and/or improve the overall conflict resolution process.

In one aspect, systems and methods are disclosed for aggregating user data from a plurality of sources. For example, the system may receive a first user input to aggregate the credit card record data of a user. In response to the first user input, the system may retrieve first user record data from a first network, and second user record data from a second network, wherein the first user record data is encoded in a first format, and the second user record data is encoded in a second format. The system may extract first merchant data and second merchant data from the first user record data and the second user record data respectively. The system may then retrieve a first merchant data category value and a second merchant data category value from the first merchant data. The system may then retrieve a first merchant data category value and a second merchant data category value from the second merchant data; comparing the first merchant data category value from the first merchant data to the first merchant data category value from the second merchant data. The system may then compare the second merchant data category value from the first merchant data to the second merchant data category value from the second merchant data.

The system may generate for display a user query to resolve a conflict between the first merchant data and the second merchant data in response to determining that the respective first merchant data category values correspond and the respective second merchant data category values do not correspond, wherein a list of aggregated credit card transactions is updated based on a user response to the user query. The system may generate for display a single credit card transaction in a list of aggregated credit card transactions of the user based on the first user record data and the second user record data in response to determining that the respective first merchant data category values correspond and the respective second merchant data category values correspond, wherein the single credit card transaction corresponds to one of the first merchant data and the second merchant data. The system may generate for display two credit card transactions in the list of aggregated credit card transactions of the user based on the first user record data and the second user record data, respectively in response to determining that the respective first merchant data category values do not correspond and the respective second merchant data category values do not correspond.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
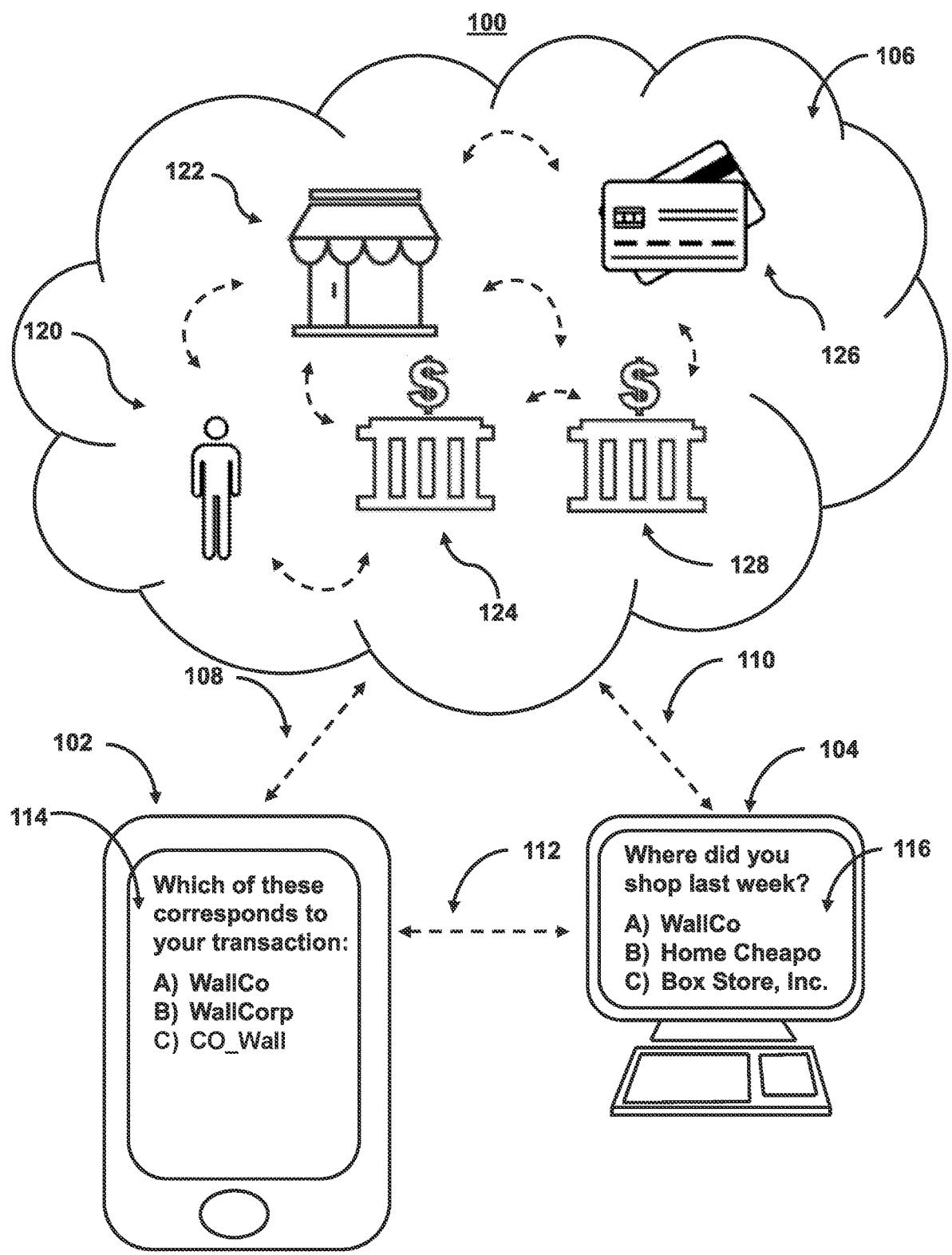
FIG. 1 shows an illustrative system for providing an aggregation service for user record data, in accordance with one or more embodiments.

FIG. 1 shows an illustrative system for providing an aggregation service for user record data, in accordance with one or more embodiments. As shown in FIG. 1, system 100 may include mobile device 102, user terminal 104, and cloud server 106. It should be noted that each component of system 100 may include additional subcomponents (e.g., additional servers and/or networks). System 100 may be used to aggregate user record data, resolve conflicts, generate user queries, compare source (e.g., merchant) data, and/or generate similarity metrics. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes cloud server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally, or alternatively, multiple users may interact with system 100 and/or one or more components of system 100. For example, in one embodiment, a first user (e.g., a credit card holder, aggregation service, etc.) and a second user (e.g., a merchant/source, a credit card issuer, etc.) may interact with system 100 using two different components.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. Additionally, as mobile device 102 and user terminal 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to aggregating record data, resolving conflicts (e.g., either transmitting requests between components, receiving requests between components, and/or processing requests between components). For example, the processors may be programmed to provide information processing capabilities in the computing devices. As such, the processors may include one or more digital processors, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Server 106 may be a database configured to store user data, record data, and/or process requests for aggregating of user record data, resolving conflicts, generating user queries, comparing source data, and/or generating similarity metrics. For example, the database may include user record data that the system has collected about the user through prior transactions. Alternatively, or additionally, the system may act as a clearing house for multiple sources of information about the user. Server 106 may also include control circuitry configured to perform the various operations needed to verify the identity of a user through contextual knowledge-based authentication. For example, server 106 may receive from mobile device 102, or user terminal 104, an authentication request for a user.

In some embodiments, a request to aggregate user record data, resolve conflicts, generate user queries, compare source data, and/or generate similarity metrics may be structured as an API request that includes a URL, body, and method. The API request may correspond to one half of the API request-response cycle between one or more devices and/or applications to complete the request. For example, the system (e.g., mobile device 102 and server 106) may communicate in HTTP (Hyper Text Transfer Protocol) through a request-response cycle. To make a valid request, the requester (e.g., mobile device 102) may include a URL (Uniform Resource Locator), method, list of headers, and/or body. The URL may indicate to server 106 (or other component) what resources to use (e.g., "ConflictResolutionApplication"). The body may contain headers and data. The headers may provide metadata about the request (e.g., the name of the requester, the user account for which access is needed, etc.) and the body may indicate the name of the user for which a request relates.

System 100 may be used for aggregating user record data, resolving conflicts, generating user queries, comparing source data, and/or generating similarity metrics. One component may be an application running on a mobile device of a user (e.g., mobile device 102). As referred to herein, user record data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record data for a transaction may include:

Transaction ID: 01234
Timestamp: 1/1/2020 01:30:55 AM UTC
Price: $57.98
Payment Currency: USD
Card Present: True
Merchant ID: 12345

Through the user of the application, the system may allow a user to transmit a request using mobile device 102. In response to receiving the request, the, e.g., aggregation service (e.g., located at server 106) may process the request and initiate an application to respond to the request (e.g., in order to present user query 114). The system may further provide one or more user queries to other users (e.g., via user query 116).

Another component of the system shown in FIG. 1 is user terminal 104. Similar to the user of mobile device 102, user terminal 104 may allow a user to access an aggregation service and aggregate user accounts of the user. User terminal 104 may also generate for display user queries (e.g., such as user query 114 and user query 116). The various components of system 100 may work in conjunction to create a credit card transaction eco-system.

For example, system 100 may involve multiple components and involve requests from one or more entities such as cardholder 120. A cardholder 120 may include a user that accesses an aggregation service in order to aggregate transactions of that user. For example, a given user may have multiple credit card accounts and thus correspond to a cardholder for multiple credit card networks. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 100 may also include source 122, which may be associated with a store and/or vendor that sells goods and/or services to the cardholder. Source 122, which may be a merchant, may accept credit card payments. Source 122 may also send card and/or user account information to, and request payment authorization from, an issuing bank of cardholder 120. Source 122 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

For example, as part of a request, an exemplary source record for a network may include:
 Merchant ID: 12345
 Network Name: Josh's Board Game Store
 Address: 1234 Main St. City, State 12346

Source 122 may include an acquiring bank 124, which may also comprise an acquiring processor or service provider. For example, the acquiring bank may receive payment authorization requests from source 122 and send them to issuing bank 128 (which may include, or be a separate entity from, acquiring bank 124). The acquiring bank 124 may then relay a response from issuing bank 128 to source 122. In some embodiments, acquiring bank 124 may be a third-party entity. Acquiring bank 124 may provide a service or device that allows source 122 to accept credit cards as well as send credit card payment details to network 126. Upon receipt, network 126 may forward the payment authorization back to acquiring bank 124.

Network 126 may include entities that operate credit card networks that process credit card payments worldwide and govern interchange fees. In some embodiments, issuing bank 128 may form part of network 126. For example, issuing bank 128 may be a financial institution that issued the credit card involved in the transaction. Issuing bank 128 may receive the payment authorization request from the credit card network and either approve or decline the transaction.

During processing, the components of system 100 may use multiple naming conventions, format, and value types of a category, value, etc. and these may differ from that of the user profile data (as stored on a user device or an aggregation service), server 106 (or other component of system 100) may use matching algorithms that may support exact match techniques and/or partial or "fuzzy" matching logic (e.g., searching for a closest or partial match) to locate alternate spellings, naming conventions, etc. for categories and/or value. For example, a column name associated with user data stored by an aggregation service may be compared to a category and/or value for the issuing bank 128. In another example, metadata associated with user data stored by an aggregation service (e.g., describing a transaction in the account of the user) may be compared to metadata of a corresponding record, entry, category, and/or value for the issuing bank 128. Based on the degree of similarity between the headings, metadata, and/or other data a "similarity metric" may be assigned using any suitable algorithm or weighting logic (e.g., as discussed in relation to FIG. 5). Exemplary records of source data that may be compared may include:
 Merchant ID: ABC456 Merchant ID: CAC459
 Network name: Josh's Board Game Store Network name: JBBoardGame12341
 Timestamp: 1/1/2020 01:30:55 AM UTC Timestamp: 1/1/2020 01:30:55 AM UTC
 Price: $57.98 Price: $57.98
 Network: Mastercard™ Network: Visa™

In some embodiments, system 100 may compare data between system components during a transaction and/or aggregation of record data. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 122 must obtain approval for payment from issuing bank 128. Source 122 may transmit record data that may include: a credit card number, card expiration date, billing address (e.g., for address verification system ("AVS")), a validation card security code ("CVV"), and/or a payment amount.

As the transaction moves through system 100, issuing bank 128 may receive the payment authorization request from network 126. Issuing bank 128 validates the credit card number, checks the amount of available funds, matches the billing address to the one on file and validates the CVV number. Issuing bank 128 approves, or declines, the transaction and sends back an appropriate response to source 122 through system 100 (e.g., via network 126 and/or acquiring bank 124). Source 122 may receive the authorization, and issuing bank 128 may place a hold in the amount of the purchase on the account of cardholder 120. A point-of-sale terminal (e.g., user terminal 104) may send all approved authorizations to be processed in a "batch" (e.g., at the end of a day, accounting period, etc.). Notably, transmitting authorizations in batches increases the need for accurate and precise data and/or conflict resolutions at a high rate of speed.

During the clearing stage, the transaction is posted to both a credit card account of cardholder 120 and source 122. Source 122 then sends the approved authorizations in a batch to acquiring bank 124. Acquiring bank 124 then routes the batched information to network 126 for settlement. Network 126 forwards each approved transaction to an appropriate issuing bank 128. Issuing bank 128 will transfer the funds and may withhold exchange fees. Network 126 may also pay acquiring bank 124 a fee. Issue bank 128 may then post the user record data to an account of cardholder 120.

Thus, a single transaction includes multiple systems each interacting with each other and handling user data that must be stored, transmitted, and verified in a precise manner. In order to ensure precision, each system and/or component of a system may use its own (and in many cases proprietary) encoding mechanisms. Additionally, or alternatively, source 122, assigning bank 124, network 126, and/or issuing bank 128 each transmit a network name (e.g., an identification system used by an assigning party to indicate a source (e.g., source 122) corresponding to a transaction. However, as each system may use a private (and likely proprietary) algorithm for facilitating transactions, a network name generated and used by one component (e.g., network 126) may not be the same as the network name used by another network.

In some embodiments, other information may vary as well. For example, information about a source (e.g., address) may not be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user (e.g., cardholder 120) based on exchange fee information.

Network name data is also not meant to be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable.

Aggregation services that aggregate accounts of users from different banks and credit card issuers, therefore, have difficulty in distinguishing between and/or de-duplicating similar entries as in many cases the record data received from different entities may be different. In such cases, conflicts in a list of transactions provided by the aggregation service may arise. As shown in FIG. 1, the aggregation service may resolve these conflicts through the user of user queries (e.g., user query 114 and 116).

As referred to herein, user queries may comprise any graphical, audio, textual, and/or video cue. The query may include a question to the user. For example, the question may be posed as a fill in the blank, multiple choice, reading comprehension, true/false, essay, voice input, etc. The user may receive the question via reading a user interface of user device 102 and/or hearing an audio output. The user may likewise input an answer to the question via a user interface of user device 102.

The user query may be generated to be unique to a user based on user data, and/or the user may be selected to receive a user query (e.g., distributed to a plurality of users) based on user data. For example, in response to detecting a conflict, the system may retrieve a user profile for a user. The user profile may include data that is actively or passively compiled on a user. For example, the data may include demographic, geographic, and/or financial data on the user. The data may indicate the preferences, tastes, habits, and/or recent activities of the user (e.g., recent purchases). The user profile may comprise a digital representation of the user. This representation may be organized into a user profile and behaviors of the user, including likely purchases and sources from which purchases were made. The representation may include any information about an event, course of action, or other circumstance related to the user. For example, the scenario may include where a user last shopped, where the user normally shops, what items were purchased, etc. The profile may also include a behavior for the user in the given scenario (e.g., the manner, way, characteristics, and/or any other information about the user's conduct in a scenario). The profile may also include one or more categories in which the user falls. These categories may be used by the system to select other users to compare to the users. The categories may include any information that distinguishes one user from another, or from a group of other users.

The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user, where does a user shop, where were purchases of the user, etc.).

The system may record the scenarios, behaviors, and user profiles as records in a database. The records may include fields with particular values corresponding to given behaviors. For example, a value for a behavior related to a shopping scenario may indicate what a user purchased, for how much, or where a user purchased a good or service. In some embodiments, the system may store alphanumeric values (e.g., describing a product that was purchased). For example, a value may in some embodiments include any quantitative or qualitative measure of the behavior of a user in a given scenario.

It should be noted that in some embodiments, the system may also combine response to user queries with one or more matching algorithms and/or machine learning algorithms in order to detect conflicts and/or compare records. For example, the system may retrieve a first value for a first user transaction from a user account of the aggregation service and compare the first value to a plurality of values (e.g., corresponding to one or more other user transactions) to identify conflicts. The system may then determine a likelihood of the first value corresponding (e.g., having a first network name) to another value (e.g., having a second network name) and/or a likelihood a first transaction corresponding to another transaction.

This likelihood may be expressed as a similarity metric. As referred to herein, a similarity metric may include a qualitative or quantitative assessment of the similarity of compared data (e.g., compared values, transactions, etc.). The similarity metric may be adjusted to provide comparisons of transactions, user record data, source data (including network names or other source data), particular values (e.g., source data category value), responses to user queries and/or any other data that the aggregation service needs to compare to facilitate aggregating user accounts. For example, the system may determine how likely the first value is with respect to another value and generate a similarity metric that represents that relationship. The similarity metric may be expressed as a number, percent, confidence level, grade, score, probability, binary analysis, and/or any other designation used to distinguish how similar the data being compared is. The system may use multiple similarity metrics, each corresponding to a different type of data. Furthermore, each similarity metric may be compared to a threshold specific to that type of data (e.g., as assigned by the aggregation service) in order to identify a match.

Figure 2:
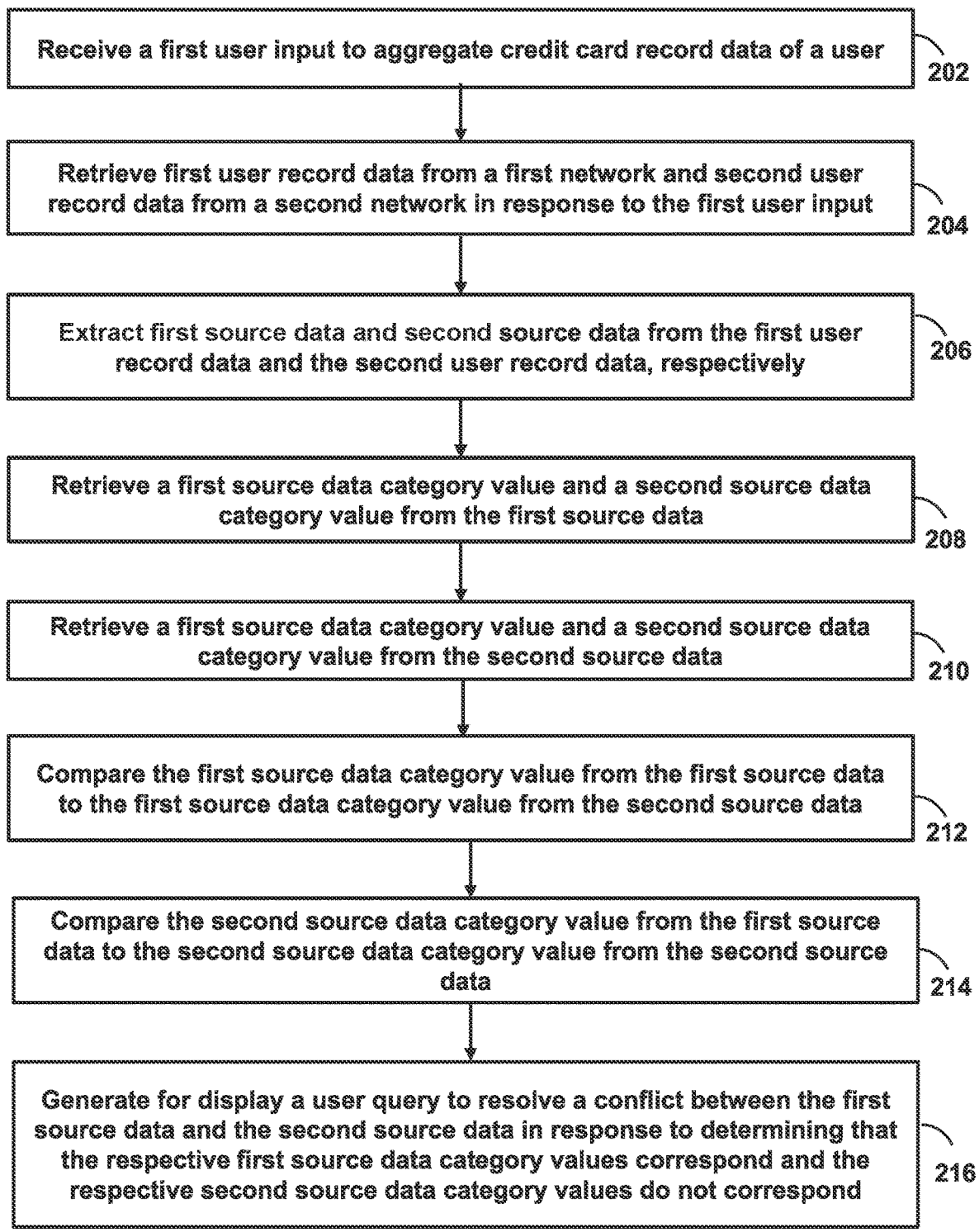
FIG. 2 shows a flowchart of the steps involved in resolving conflicts between source data, in accordance with one or more embodiments.

FIG. 2 shows a flowchart of the steps involved in resolving conflicts between source data, in accordance with one or more embodiments. For example, process 200 may represent a process for generating a user query (e.g., user query 114 (FIG. 1)).

At step 202, process 200 receives (e.g., by control circuitry of one or more of the devices in FIG. 1) a first user input to aggregate credit card record data of a user. For example, the system may receive a user input via user device 102 (FIG. 1)).

At step 204, process 200, in response to the first user input, retrieves (e.g., by control circuitry of one or more of the devices in FIG. 1) first user record data from a first network (or other source of record data) and second user record data from a second network (or other source of record data). For example, the first user record data may be encoded in a first format and the second user record data may be encoded in a second format.

At step 206, process 200 extracts (e.g., by control circuitry of one or more of the devices in FIG. 1) first source data (e.g., first merchant data) and second source data (e.g., second merchant data) from the first user record data and the second user record data, respectively.

At step 208, process 200 retrieves (e.g., by control circuitry of one or more of the devices in FIG. 1) a first source data category value and a second source data category value from the first source data. For example, the system may retrieve a first type of source data (e.g., a payment amount), and may extract a second type of source data (e.g., a network name) from the first source data.

At step 210, process 200 retrieves (e.g., by control circuitry of one or more of the devices in FIG. 1) a first source data category value and a second source data category value from the second source data. For example, the system may retrieve a first type of source data (e.g., a payment amount) and may retrieve a second type of source data (e.g., a network name) from the second source data. In some embodiments, the system may extract both a native form of a network name and a cleansed network name.

At step 212, process 200 compares (e.g., by control circuitry of one or more of the devices in FIG. 1) the first source data category value from the first source data to the first source data category value from the second source data. In some embodiments, the system may compare the first source data category value from the first source data to the first source data category value from the second source data by applying a fuzzy string matching algorithm that: removes numerals and special characters from the first source data category value from the first source data and the first source data category value from the second source data; identifies root words in the first source data category value from the first source data, and the first source data category value from the second source data; and matches the root words, irrespective of order, in the first source data category value from the first source data, and the first source data category value from the second source data. For example, the system may select a fuzzy string matching algorithm that is designed to interrupt human text or human consumable text (as opposed to native computer information). By using this algorithm on the cleansed network name, the effectiveness is improved.

At step 214, process 200 compares (e.g., by control circuitry of one or more of the devices in FIG. 1) the second source data category value from the first source data to the second source data category value from the second source data. For example, as described in step 212, the system may apply a fuzzy string matching algorithm to compare the values.

At step 216, process 200 generates for display (e.g., by control circuitry of one or more of the devices in FIG. 1) a user query to resolve a conflict between the first source data and the second source data in response to determining that the respective first source data category values correspond and the respective second source data category values do not correspond. For example, the system may update a list of aggregated credit card transactions based on a user response to the user query. For example, the user query may include a user selectable option for resolving the conflict in favor of the first source data or the second source data. In some embodiments, as described in FIG. 3, the system may generate a plurality of user queries in order to crowd source the conflict resolution.

In some embodiments, the system may generate for display a single credit card transaction in a list of aggregated credit card transactions of the user based on the first user record data, and the second user record data in response to determining that the respective first source data category values correspond, and the respective second source data category values correspond, wherein the single credit card transaction corresponds to one of the first source data and the second source data. Additionally, or alternatively, the system may generate for display a two credit card transaction in the list of aggregated credit card transactions of the user based on the first user record data and the second user record data respectively in response to determining that the respective first source data category values do not correspond, and the respective second source data category values do not correspond.

For example, in order to resolve conflicting user transactions, the system may generate a user query with a question that aids in distinguishing between the conflicting information. For example, if the system detects two transactions with some corresponding information (e.g., payment amount, time stamp, etc.), but different network names, the system may generate a user query. The user query may process the human readable (e.g., cleansed network name) to generate a human readable question (e.g., "which source is this transaction related to?"). Upon receiving the answer, the system may determine whether a given cleansed network name corresponds to the same transaction. By doing so, the system may de-duplicate user transactions for use in generate correct account information by the aggregation service.

As the network name generation process is encoded in a proprietary manner, relying on the native network name may not sufficiently precise, and thus require a comparison by a user. In some embodiments, by relying on the cleansed, human readable version of the network name, the system can resolve conflicts more effectively and in an automated manner. Additionally, or alternatively, by using automated system that would conventionally be used to understand human speech (as opposed to process native account information); the system may generate better user queries and/or improve the conflict resolution process.

It is contemplated that the steps or descriptions of FIG. 2 may be used with any other embodiment of this disclosure. In addition, the steps and descriptions described in relation to FIG. 2 may be done in alternative orders or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one or more of the steps in FIG. 2.

Figure 3:
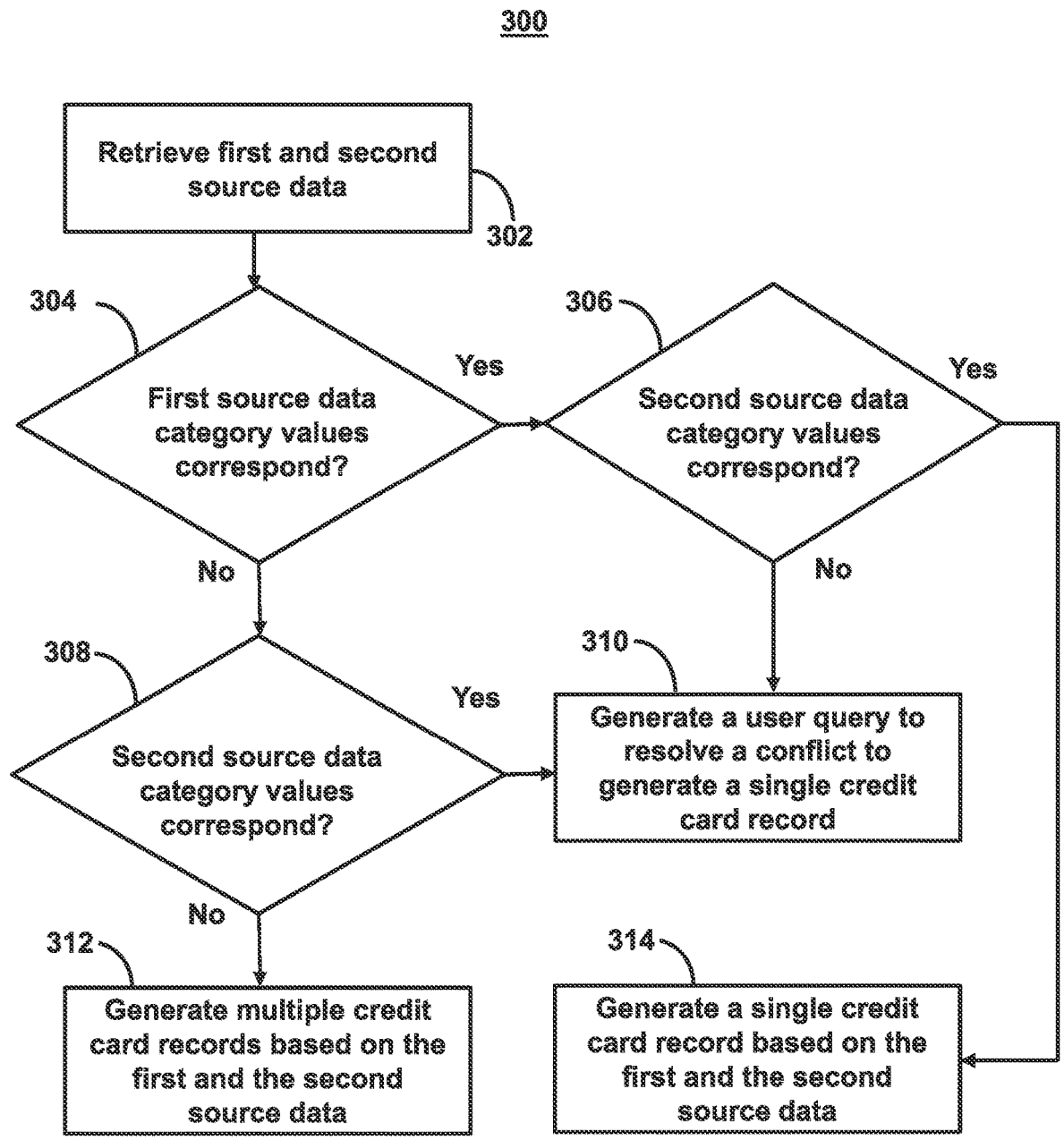
FIG. 3 shows a flowchart of the steps involved in generating credit card transactions for presentation in an aggregated list, in accordance with one or more embodiments.

FIG. 3 shows a flowchart of the steps involved in generating credit card transactions for presentation in an aggregated list in accordance with one or more embodiments. For example, process 300 may represent the steps taken by one or more devices as shown in FIG. 1 when aggregating user transactions into a list of user transactions of a given user.

At step 302, process 300 retrieves (e.g., by control circuitry of one or more of the devices in FIG. 1) first and second source data (e.g., first and second merchant data). For example, the system may extract the source data from a user record data.

At step 304, process 300 determines (e.g., by control circuitry of one or more of the devices in FIG. 1) whether the first source data category values correspond. For example, the first source data category value may include a payment amount value, a time stamp value, a source address value, a source name value, or a network name value. If the first source data category values correspond, process 300 continues to step 306. If the first source data category values do not correspond, process 300 continues to step 308.

At step 306, process 300 determines (e.g., by control circuitry of one or more of the devices in FIG. 1) whether the second source data category values correspond. For example, the second source data category may correspond to a network name. For example, the system may determine that if some source data category values match and some do not, the potential for a conflict exists. If the second source data category values correspond, process 300 continues to step 314. If the second source data category values do not correspond, process 300 continues to step 310.

At step 308, process 300 determines (e.g., by control circuitry of one or more of the devices in FIG. 1) whether the second source data category values correspond. If the second source data category values correspond, process 300 continues to step 310. If the second source data category values do not correspond, process 300 continues to step 312.

At step 310, process 300 generates (e.g., by control circuitry of one or more of the devices in FIG. 1) a user query to resolve a conflict to generate a single credit card record. For example, in response to determining that some source data corresponds between user transactions (e.g., a payment amount, source address, and/or time stamp), but some source data does not (e.g., a network name), the system may determine a conflict. In some embodiments, the system may further process potential conflicts to determine a similarity metric (as described in FIG. 5). If the system determines that the metric exceeds a threshold (e.g., as determined by the aggregation service) the system may designate the user transactions as having a conflict.

At step 312, process 300 generates (e.g., by control circuitry of one or more of the devices in FIG. 1) multiple credit card records based on the first and the second source data. For example, in response to determining that the source data (or particularly important categories of source data) do not correspond, the system may determine that the user transactions do not correspond to the same source and/or transaction. The system may then post both transactions in the aggregated list of user transactions.

At step 314, process 300 generates (e.g., by control circuitry of one or more of the devices in FIG. 1) a single credit card record based on the first and the second source data. For example, in response to determining that all source data corresponds, the system may de-duplicate the transactions and only post a single transaction in the aggregated list of user transactions. It should be noted that in some embodiments, the system may determine a similarity metric for multiple categories of data. In response to determining that the similarity metric for one or more categories exceeds the threshold, the system may determine that the category values correspond.

It is contemplated that the steps or descriptions of FIG. 3 may be used with any other embodiment of this disclosure. In addition, the steps and descriptions described in relation to FIG. 3 may be done in alternative orders, or in parallel, to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one of more of the steps in FIG. 3.

Figure 4:
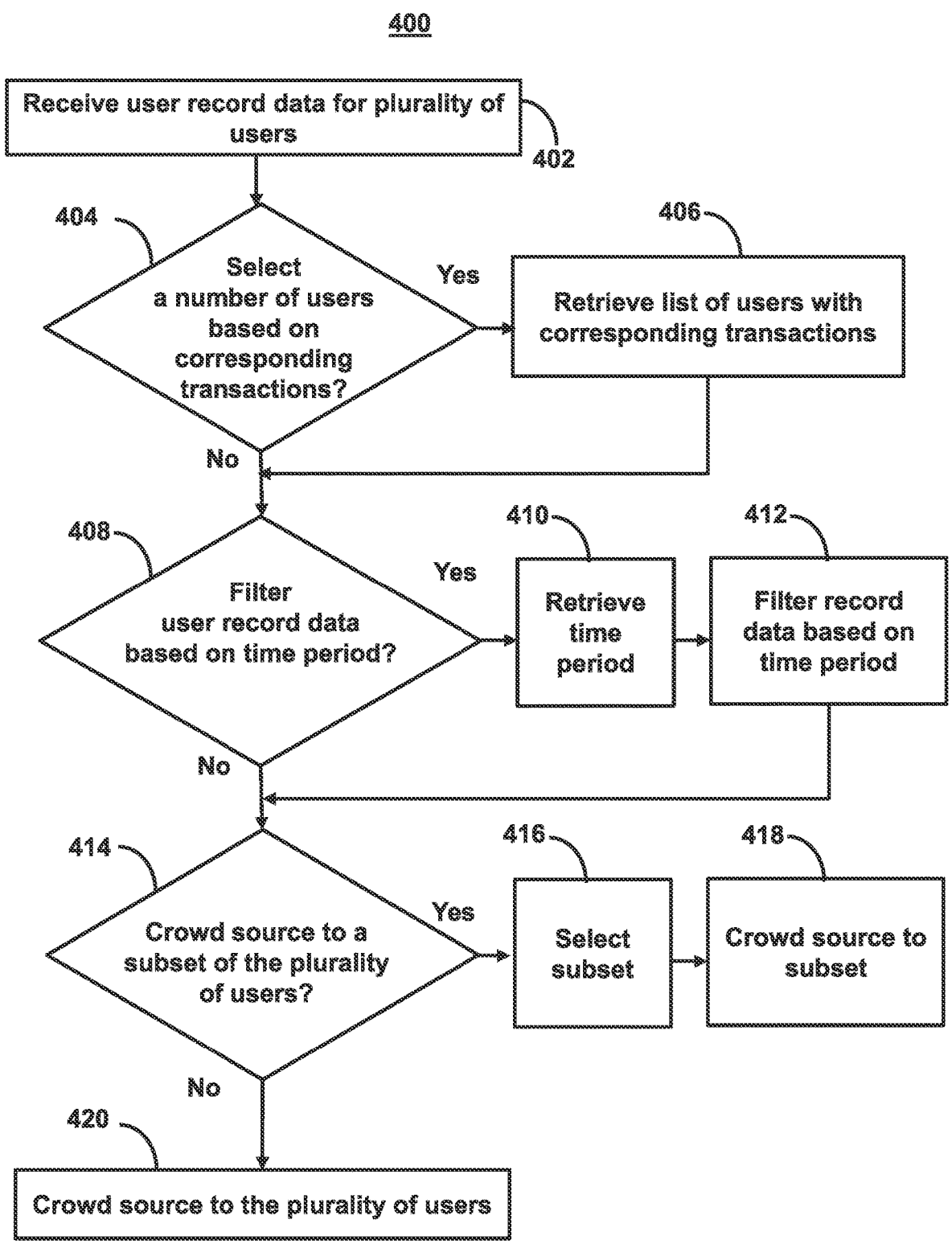
FIG. 4 shows a flowchart of the steps involved in crowd sourcing user queries to users, in accordance with one or more embodiments, in accordance with one or more embodiments.

FIG. 4 shows a flowchart of the steps involved in crowd sourcing user queries to users, in accordance with one or more embodiments. For example, process 400 may represent the steps taken by one or more devices as shown in FIG. 1 when generating user queries to resolve conflicts. In some embodiments, the system may crowd-source the user query to a plurality of other users based on respective user record data for the plurality of other users, including the first source data or the second source data. For example, the system may determine other users that also have the first source data or the second source data and generate crow sourced user queries to those users. The system may then aggregate responses from the plurality of other users. For example, the aggregated responses may be used by the system to resolve a conflict.

At step 402, process 400 receives (e.g., by control circuitry of one or more of the devices in FIG. 1) user record data for a plurality of users. For example, the system may monitor user profiles for the plurality of users, and retrieve user record data for each of the plurality of users.

At step 404, process 400 determines (e.g., by control circuitry of one or more of the devices in FIG. 1) whether to select a number of users based on corresponding transactions. For example, the system may select a number of the plurality of other users based on a percentage of users with user record data that includes the first source data or the second source data. If process 400 determines to select a number of users based on corresponding transactions, process 400 continues to step 406. If process 400 determines not to select a number of users based on corresponding transactions, process 400 continues to step 408.

At step 406, process 400 retrieves (e.g., by control circuitry of one or more of the devices in FIG. 1) a list of users with corresponding transactions. For example, the system may find users that potentially have experience with the same source, types of transactions, etc.

At step 408, process 400 determines (e.g., by control circuitry of one or more of the devices in FIG. 1) whether to filter user record data based on time period. For example, the system may retrieve a threshold time period, determine whether the respective user record data is from the threshold time period, and select the plurality of other users based on the respective user record data corresponding to the threshold time period. If process 400 determines to filter user record data based on time period, process 400 continues to step 410. If process 400 determines not to filter user record data based on time period, process 400 continues to step 414.

At step 410, process 400 retrieves (e.g., by control circuitry of one or more of the devices in FIG. 1) a time period for filtering user record data. For example, the system may determine that user record data is recent in order to ensure that network names assigned by a given source (e.g., credit card issuer) has not been changed.

At step 412, process 400 filters (e.g., by control circuitry of one or more of the devices in FIG. 1) record data based on time period. For example, the system may filter out potential transactions that may have network names that have been changed.

At step 414, process 400 determines (e.g., by control circuitry of one or more of the devices in FIG. 1) whether to crowd source a user query to a subset of the plurality of users. For example, the system may determine whether or not to only select a few users to crowd source a user query. If process 400 determines to crowd source to a subset of the plurality of users, process 400 continues to step 416. If process 400 determines not to crowd source to a subset of the plurality of users, process 400 continues to step 420.

At step 416, process 400 selects (e.g., by control circuitry of one or more of the devices in FIG. 1) a subset of the plurality of users from which to crowd source a user query. For example, the system may apply one or more additional criteria to select a subset of users. The additional criteria may include similar geographic or demographic information.

At step 418, process 400 crowd sources (e.g., by control circuitry of one or more of the devices in FIG. 1) the user query to a subset of the plurality of users. For example, the system may push user queries to multiple users simultaneously based on the users corresponding to the subset.

At step 420, process 400 crowd sources (e.g., by control circuitry of one or more of the devices in FIG. 1) the user query to all users. For example, the system may push user queries to all users simultaneously based on the users having corresponding user record data and/or potential interactions with a given source.

It is contemplated that the steps or descriptions of FIG. 4 may be used with any other embodiment of this disclosure. In addition, the steps and descriptions described in relation to FIG. 4 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one of more of the steps in FIG. 4.

Figure 5:
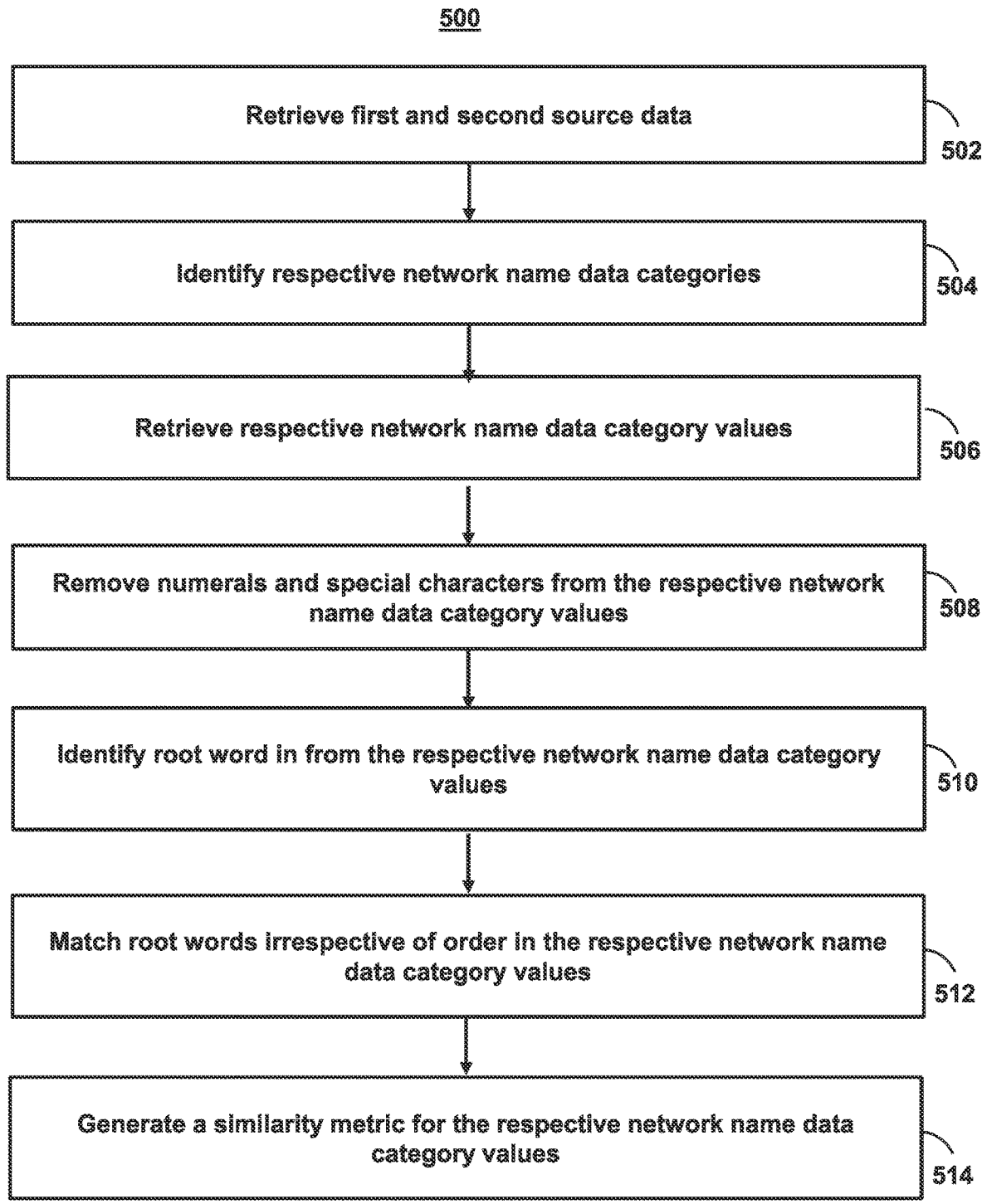
FIG. 5 shows a flowchart of the steps involved in generating a similarity metric for the respective network name data category values, in accordance with one or more embodiments.

FIG. 5 shows a flowchart of the steps involved in generating a similarity metric for the respective network name data category values, in accordance with one or more embodiments. For example, process 500 may represent the steps taken by one or more devices as shown in FIG. 1 when comparing source data (e.g., merchant data). For example, in some embodiments, the first user record data may be encoded in a first format and the second user record data may be encoded in a second format. In some embodiments, the first format is specific to the first network, and the second format is specific to the second network.

At step 502, process 500 retrieves (e.g., by control circuitry of one or more of the devices in FIG. 1) first and second source data (e.g., first and second merchant data). For example, the first and second source data may be extracted from user record data (e.g., as described in FIG. 2).

At step 504, process 500 identifies (e.g., by control circuitry of one or more of the devices in FIG. 1) respective network name data categories. For example, in response to detecting that the source data conflicts based on a first source data category value (e.g., a payment amount) corresponding for two user transactions and a second source data category value (a network name) not corresponding for two user transactions.

At step 506, process 500 retrieves (e.g., by control circuitry of one or more of the devices in FIG. 1) respective network name data category values. For example, the system may determine which source data category corresponds to the network name based on parsing each data category value for indicia of a network name (e.g., specific characters, string length, etc.) or based on metadata associated with the source data.

At step 508, process 500 removes (e.g., by control circuitry of one or more of the devices in FIG. 1) numerals and special characters from the respective network name data category values. For example, in order to generate and better identify potentially matching sources the system may process the network name to remove excess numerals and special characters.

At step 510, process 500 identifies (e.g., by control circuitry of one or more of the devices in FIG. 1) root words in the respective network name data category values. For example, the system may identify root words, which are a good indicator of the identity of the source.

At step 512, process 500 matches (e.g., by control circuitry of one or more of the devices in FIG. 1) root words irrespective of order in the respective network name data category values. For example, the system may match root words without bias towards the order of the root words.

At step 514, process 500 generates (e.g., by control circuitry of one or more of the devices in FIG. 1) a similarity metric for the respective network name data category values. For example, the system may compare the processed network names to determine if the network names are sufficiently similar to trigger a conflict.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for aggregating user data from a plurality of sources, the method comprising: receiving a first user input to aggregate credit card record data of a user; in response to the first user input, retrieving first user record data from a first network and second user record data from a second network, wherein the first user record data is encoded in a first format and the second user record data is encoded in a second format; extracting first source data and second source data from the first user record data and the second user record data respectively; retrieving a first source data category value and a second source data category value from the first source data; retrieving a first source data category value and a second source data category value from the second source data; comparing the first source data category value from the first source data to the first source data category value from the second source data; comparing the second source data category value from the first source data to the second source data category value from the second source data; and in response to determining that the respective first source data category values correspond and the respective second source data category values do not correspond, generating for display a user query to resolve a conflict between the first source data and the second source data, wherein a list of aggregated credit card transactions is updated based on a user response to the user query.

2. The method of embodiment 1, further comprising generating for display a single credit card transaction in a list of aggregated credit card transactions of the user based on the first user record data and the second user record data in response to determining that the respective first source data category values correspond, and the respective second source data category values correspond, wherein the single credit card transaction corresponds to one of the first source data and the second source data.

3. The method of embodiments 1 or 2, further comprising generating for display a two credit card transaction in the list of aggregated credit card transactions of the user based on the first user record data and the second user record data, respectively in response to determining that the respective first source data category values do not correspond, and the respective second source data category values do not correspond.

4. The method of any one of embodiments 1-3, wherein generating for display the user query comprises: crowd-sourcing the user query to a plurality of other users based on respective user record data for the plurality of other users including the first source data or the second source data; and aggregating responses from the plurality of other users.

5. The method of any one of embodiments 1-4, further comprising crowd-sourcing the user query to a plurality of other users based on respective user record data for the plurality of other users by: retrieving a threshold time period; determining whether the respective user record data is from the threshold time period; and selecting the plurality of other users based on the respective user record data corresponding to the threshold time period.

6. The method of any one of embodiments 1-5, further comprising: selecting a number of a plurality of other users for crowd-sourcing the user query based on a percentage of users with user record data that includes the first source data or the second source data.

7. The method of any one of embodiments 1-6, wherein the user query includes a user selectable option for resolving the conflict in favor of the first source data or the second source data.

8. The method of any one of embodiments 1-7, wherein the first format is specific to the first network and the second format is specific to the second network.

9. The method of any one of embodiments 1-8, wherein the first source data category value includes a payment amount value, a time stamp value, a source address value, a source name value, or a network name value.

10. The method of any one of embodiments 1-9, wherein comparing the first source data category value from the first source data to the first source data category value from the second source data further comprises applying a fuzzy string matching algorithm that: removes numerals and special characters from the first source data category value from the first source data and the first source data category value from the second source data; identifies root words in the first source data category value from the first source data and the first source data category value from the second source data; and matches the root words irrespective of order in the first source data category value from the first source data and the first source data category value from the second source data.

11. A tangible, non-transitory, machine-readable, medium storing instruction that, when executed by a data processing apparatus, causes the data processing apparatus to perform operations comprising those of any of embodiments 1-12.

12. A system comprising: one or more processors and memory storing instructions that, when executed by the processors, cause the processors to effectuate operations comprising those of any of embodiments 1-12.

13. A system comprising means for performing any of embodiments 1-12.

What is claimed is:

1. A system for aggregating user data from a plurality of sources, the system comprising:
   cloud-based memory configured to store first user record data from a first network and second user record data from a second network, wherein the first user record data is encoded in a first format and the second user record data is encoded in a second format;
   cloud-based control circuitry configured to:
      extract first source data and second source data from the first user record data and the second user record data, respectively;
      retrieve a first source data category value and a second source data category value from the first source data;
      retrieve a first source data category value and a second source data category value from the second source data;
      compare the first source data category value from the first source data to the first source data category value from the second source data;

compare the second source data category value from the first source data to the second source data category value from the second source data; and generate for display a single credit card record in a list of aggregated credit card records of the user based on the first user record data and the second user record data, wherein the single credit card record corresponds to one of the first source data and the second source data in response to determining that the respective first source data category values correspond and the respective second source data category values correspond;

generate for display two credit card records in the list of aggregated credit card records of the user based on the first user record data and the second user record data, respectively in response to determining that the respective first source data category values do not correspond and the respective second source data category values do not correspond; and generate for display a user query to resolve a conflict between the first source data and the second source data in response to determining that the respective first source data category values correspond and the respective second source data category values do not correspond, wherein the list of aggregated credit card records is updated based on a user response to the user query;

receive a first user input responding to the user query; and update a list of aggregated credit card records based on the first user input.

2. A method for aggregating user data from a plurality of sources, the method comprising:

retrieving first user record data from a first network and second user record data from a second network, wherein the first user record data is encoded in a first format and the second user record data is encoded in a second format;

extracting first source data and second source data from the first user record data and the second user record data, respectively;

retrieving a first source data category value and a second source data category value from the first source data;

retrieving a first source data category value and a second source data category value from the second source data;

comparing the first source data category value from the first source data to the first source data category value from the second source data;

comparing the second source data category value from the first source data to the second source data category value from the second source data; and in response to determining that the respective first source data category values correspond and the respective second source data category values do not correspond, generating for display a user query to resolve a conflict between the first source data and the second source data;

receiving a first user input responding to the user query; and updating a list of aggregated credit card records based on the first user input.

3. The method of claim 2, further comprising generating for display a single credit card record in the list of aggregated credit card records of the user based on the first user record data and the second user record data in response to determining that the respective first source data category values correspond and the respective second source data category values correspond, wherein the single credit card record corresponds to one of the first source data and the second source data.

4. The method of claim 2, further comprising generating for display a two credit card record in the list of aggregated credit card records of the user based on the first user record data and the second user record data, respectively in response to determining that the respective first source data category values do not correspond and the respective second source data category values do not correspond.

5. The method of claim 2, wherein generating for display the user query comprises:

crowd-sourcing the user query to a plurality of other users based on respective user record data for the plurality of other users including the first source data or the second source data; and aggregating responses from the plurality of other users.

6. The method of claim 5, wherein crowd-sourcing the user query to a plurality of other users based on respective user record data for the plurality of other users, further comprises:

retrieving a threshold time period;

determining whether the respective user record data is from the threshold time period; and selecting the plurality of other users based on the respective user record data corresponding to the threshold time period.

7. The method of claim 5, further comprising:

selecting a number of the plurality of other users based on a percentage of users with user record data that includes the first source data or the second source data.

8. The method of claim 2, wherein the user query includes a user selectable option for resolving the conflict in favor of the first source data or the second source data.

9. The method of claim 2, wherein the first format is specific to the first network and the second format is specific to the second network.

10. The method of claim 2, wherein the first source data category value includes an amount value, a time stamp value, a source address value, a source name value, or a network name value.

11. The method of claim 2, wherein comparing the first source data category value from the first source data to the first source data category value from the second source data, further comprises applying a fuzzy string matching algorithm that:

removes numerals and special characters from the first source data category value from the first source data and the first source data category value from the second source data;

identifies root words in the first source data category value from the first source data and the first source data category value from the second source data; and matches the root words irrespective of order in the first source data category value from the first source data and the first source data category value from the second source data.

12. A non-transitory computer-readable medium comprising instructions that, when executed by one or more processors, cause operations comprising:

retrieving first user record data from a first network and second user record data from a second network, wherein the first user record data is encoded in a first format and the second user record data is encoded in a second format;

extracting first source data and second source data from the first user record data and the second user record data, respectively;

retrieving a first source data category value and a second source data category value from the first source data;

retrieving a first source data category value and a second source data category value from the second source data;

comparing the first source data category value from the first source data to the first source data category value from the second source data;

comparing the second source data category value from the first source data to the second source data category value from the second source data; and in response to determining that the respective first source data category values correspond and the respective second source data category values do not correspond, generating for display a user query to resolve a conflict between the first source data and the second source data;

receiving a first user input responding to the user query; and updating a list of aggregated credit card records based the first user input.

13. The non-transitory computer-readable medium of claim 12, further comprising instructions that cause operations comprising:

generating for display a single credit card record in a list of aggregated credit card records of the user based on the first user record data and the second user record data in response to determining that the respective first source data category values correspond and the respective second source data category values correspond, wherein the single credit card record corresponds to one of the first source data and the second source data; or generating for display a two credit card record in the list of aggregated credit card records of the user based on the first user record data and the second user record data, respectively in response to determining that the respective first source data category values do not correspond and the respective second source data category values do not correspond.

14. The non-transitory computer-readable medium of claim 12, wherein generating for display the user query comprises:

crowd-sourcing the user query to a plurality of other users based on respective user record data for the plurality of other users including the first source data or the second source data; and aggregating responses from the plurality of other users.

15. The non-transitory computer-readable medium of claim 14, wherein crowd-sourcing the user query to a plurality of other users based on respective user record data for the plurality of other users, further comprises:

retrieving a threshold time period;

determining whether the respective user record data is from the threshold time period; and selecting the plurality of other users based on the respective user record data corresponding to the threshold time period.

16. The non-transitory computer-readable medium of claim 14, further comprising instructions that cause operations comprising:

selecting a number of the plurality of other users based on a percentage of users with user record data that includes the first source data or the second source data.

17. The non-transitory computer-readable medium of claim 12, wherein the user query includes a user selectable option for resolving the conflict in favor of the first source data or the second source data.

18. The non-transitory computer-readable medium of claim 12, wherein the first format is specific to the first network and the second format is specific to the second network.

19. The non-transitory computer-readable medium of claim 12, wherein the first source data category value includes an amount value, a time stamp value, a source address value, a source name value, or a network name value.

20. The non-transitory computer-readable medium of claim 12, wherein comparing the first source data category value from the first source data to the first source data category value from the second source data, further comprises applying a fuzzy string matching algorithm that:

removes numerals and special characters from the first source data category value from the first source data and the first source data category value from the second source data;

identifies root words in the first source data category value from the first source data and the first source data category value from the second source data; and matches the root words irrespective of order in the first source data category value from the first source data and the first source data category value from the second source data.

* * * * *